(12) United States Patent
Gotou et al.

(10) Patent No.: US 9,226,264 B2
(45) Date of Patent: Dec. 29, 2015

(54) USER EQUIPMENT WITH TIMER CONTROLLER

(71) Applicants: Kouhei Gotou, Tokyo (JP); Masashi Kanauchi, Tokyo (JP)

(72) Inventors: Kouhei Gotou, Tokyo (JP); Masashi Kanauchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/796,362

(22) Filed: Jul. 10, 2015

(65) Prior Publication Data

US 2015/0319736 A1 Nov. 5, 2015

Related U.S. Application Data

(63) Continuation of application No. 14/144,727, filed on Dec. 31, 2013, now Pat. No. 9,084,219, which is a continuation of application No. 13/642,882, filed as application No. PCT/JP2011/059413 on Apr. 15, 2011, now Pat. No. 8,655,359.

(30) Foreign Application Priority Data

Apr. 28, 2010 (JP) .................. 2010-102860

(51) Int. Cl.
| | |
|---|---|
| H04W 4/00 | (2009.01) |
| H04W 68/02 | (2009.01) |
| H04W 60/00 | (2009.01) |
| H04W 60/02 | (2009.01) |
| H04W 88/06 | (2009.01) |

(52) U.S. Cl.
CPC ............ *H04W 68/02* (2013.01); *H04W 60/005* (2013.01); *H04W 60/02* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 2010/0120427 A1 | 5/2010 | Guo | |
| 2011/0312348 A1 | 12/2011 | Kulakov et al. | |

OTHER PUBLICATIONS

Notice of Allowance issued Oct. 1, 2013 in U.S. Appl. No. 13/642,882.

*Primary Examiner* — Suhail Khan
(74) *Attorney, Agent, or Firm* — Sughrue Mion, PLLC

(57) ABSTRACT

As a result of ISR being enabled between a portable terminal device and a network which are capable of communicating by using the communication protocols of a plurality of wireless access technologies, the portable terminal device performs position registration processing between the plurality of wireless access technologies and the portable terminal device each time a fixed period of time elapses, and the portable terminal device is able to move between the plurality of wireless access technologies that have already been registered, without conducting new position registration processing. At this time, if there is a possibility of there being a difference in ISR states (activated or not activated) between the portable terminal device and the network, the portable terminal device ignores any instructions issued by the network for ISR to be enabled in the portable terminal device.

24 Claims, 4 Drawing Sheets

USER EQUIPMENT WITH TIMER CONTROLLER

CROSS REFERENCE TO RELATED APPLICATIONS

This is a Continuation of U.S. application Ser. No. 14/144,727 filed Dec. 31, 2013, which is a Continuation of U.S. application Ser. No. 13/642,882 filed Nov. 26, 2012, now U.S. Pat. No. 8,655,359, which is a U.S. national stage of application No. PCT/JP2011/059413 filed on Apr. 15, 2011, which claims priority from Japanese Patent Application No. 2010-102860, filed on Apr. 28, 2010, the disclosures of all of which are incorporated herein by reference.

TECHNICAL FIELD

The present invention relates to a portable terminal device such as a mobile phone and the like, and especially relates to a radio access system and a portable terminal device that support a communication system in relation to a plurality of radio access technologies (RATs).

BACKGROUND ART

In a communication system defined as Long Term Evolution (LTE) or Evolved Universal Terrestrial Radio Access (E-UTRA) in Third Generation Partnership Project (3GPP) standardization, a function called "Idle mode Signaling Reduction (ISR)" is introduced in order to reduce a frequency of location registration processing that occurs in relationship with a network when a portable terminal device, being compatible with a communication system (such as Global System for Mobile communications (GSM), Universal Mobile Telecommunications System, and the like) in relation to a plurality of RATs, moves among different RATs. When ISR is active, the portable terminal device holds both a location registration information parameter related to GSM or UMTS and a location registration information parameter related to LTE, both the location registration information parameters being received from the network. Then, the portable terminal device becomes ready to move between a GSM/UMTS area and an LTE area, for both of which location registration processing has already been carried out, without location registration processing with the network.

General descriptions on ISR are defined in non-patent literatures NPL1 to NPL3 that are specifications of 3GPP.

CITATION LIST

Non-Patent Literature

NPL1: TS23. 401: General Packet Radio Service (GPRS) enhancements for Evolved Universal Terrestrial Radio Access Network (E-UTRAN) access (http://www.3gpp.org/ftp/Specs/html-info/23401.htm)

NPL2: TS24. 301: Non-Access-Stratum (NAS) protocol for Evolved Packet System (EPS); Stage 3 (http://www.3gpp.org/ftp/Specs/html-info/24301.htm)

NPL3: TS24. 008: Mobile radio interface Layer 3 specification; Core network protocols; Stage 3 (http://www.3gpp.org/ftp/Specs/html-info/24008.htm)

SUMMARY OF INVENTION

Technical Problem

Incidentally, if once an instruction on ISR activation is provide in an ISR function of 3GPP from a network after expiration of a location registration cycle timer owned by a portable terminal device, thereafter sometimes the portable terminal device does not start an ISR inactivation timer so that ISR remains activated. In this case, there arises a situation of conflict; namely the network operates on the premise of ISR being inactivated, meanwhile the portable terminal device operates on the premise of ISR being activated.

That is because each of the portable terminal device and the network has a location registration timer individually for synchronizing the status of location registration, and both the timers are not completely identical with each other, and specifically the timer that the network has is set to be longer in accordance with specifications.

Moreover, under conditions where arises the situation of conflict with respect to ISR between the network and the portable terminal device, if the portable terminal device moves into an area with a different RAT and then location registration processing is carried out, the network becomes unable to take over the location registration information of the portable terminal device between the areas of the different RATs.

That is because, in the case where the portable terminal device moves between areas in such a way as to cross over RATs, a terminal-specific identifier to be specified for a location registration requesting message, which the portable terminal device sends to the network, becomes different, depending on whether ISR is active or inactive (wherein, the identifier being one of Globally Unique Temporary Identifier (GUTI), Packet Temporary Mobile Subscriber Identity (P-TMSI), and the like). If the portable terminal device sends a location registration requesting message on the basis of ISR being active under conditions where arises the situation of conflict with respect to ISR between the network and the portable terminal device, the location registration information from the RAT before moving between the areas cannot be taken over inside the network in accordance with specifications in 3 GPP.

Moreover, in the case where, even after the portable terminal device moves into an area with a different RAT and then location registration processing is carried out, the network still cannot take over the location registration information of the portable terminal device between the areas of the different RATs, the portable terminal device is likely to receive an unnecessary request on releasing registration from the network.

That is because, in the case where the network cannot take over the location registration information of the portable terminal device between the areas of the different RATs, the network is allowed to request the portable terminal device to once release the registration and carry out again location registration processing, as the network's operation, in order to obtain correct location registration information of the portable terminal device.

Thus, it is an object of the present invention to give solutions for the subjects described above, and to provide a radio access system and a portable terminal device that can prevent in advance the situation of conflict with respect to ISR with the network.

Solution to Problem

According to a first aspect of the present invention, provided is a radio access system, including: carrying out location registration processing by a portable terminal device with a plurality of radio access technologies, at every time after a certain time period passes by way of activating ISR (Idle mode Signaling Reduction) between the portable terminal device and a network, which are able to communicate with each other through a communication system in relation to the plurality of radio access technologies; and enabling the portable terminal device to move without newly carrying out location registration processing between radio access technologies for which location registration has already been carried out; wherein, under conditions where the portable terminal device and the network hold the potential to have individually different status on whether the ISR is active or inactive, even if the network gives the portable terminal device a command to activate the ISR, the portable terminal device ignores the command.

It is preferable that, without carrying out location registration processing for a radio access technology having had location registration up to the time even after a passage of the certain time period, if the portable terminal device carries out location registration processing for another radio access technology under a situation where the ISR is inactive, the portable terminal device keeps the ISR being inactive, even though the network gives the portable terminal device a command to activate the ISR.

It is preferable that, in the case where the portable terminal device moves to the radio access technology having had location registration up to the time, after carrying out location registration processing for the other radio access technology, in order to carries out location registration processing, the portable terminal device requests the network to carry out location registration processing under conditions of a setup in which the network can take over location registration information between the other radio access technology and the radio access technology having had location registration up to the time.

Moreover, even in the case where the portable terminal device cannot carry out location registration processing for a radio access technology having had location registration up to the time, even after a passage of the certain time period under a situation where the ISR is active, if the ISR cannot be inactivated after a predetermined time period following the passage of the certain time period, even though the network gives the portable terminal device a command to activate the ISR, the portable terminal device may ignore the command.

According to a second aspect of the present invention, provided is a radio terminal device, including: a radio unit that can communicate via radio waves with a network by means of a communication system in relation to a plurality of radio access technologies; and a communication controller for controlling communication by the radio unit with respect to each of the plurality of radio access technologies; wherein, the communication controller carries out location registration processing with the network, with respect to each of the plurality of radio access technologies; the communication controller executes ISR in such a way as to enable moving without newly carrying out location registration processing between radio access technologies for which location registration has already been carried out; and under conditions where the communication controller and the network hold the potential to have individually different status on whether the ISR is active or inactive, even if the network gives a command to activate the ISR, the communication controller ignores the command.

Advantageous Effect of Invention

According to the present invention, it is possible as an effect to prevent in advance the situation of conflict with respect to ISR with the network.

DESCRIPTION OF EMBODIMENTS

An exemplary embodiment of the present invention is explained below in detail with reference to the accompanied drawings.

Figure 1:
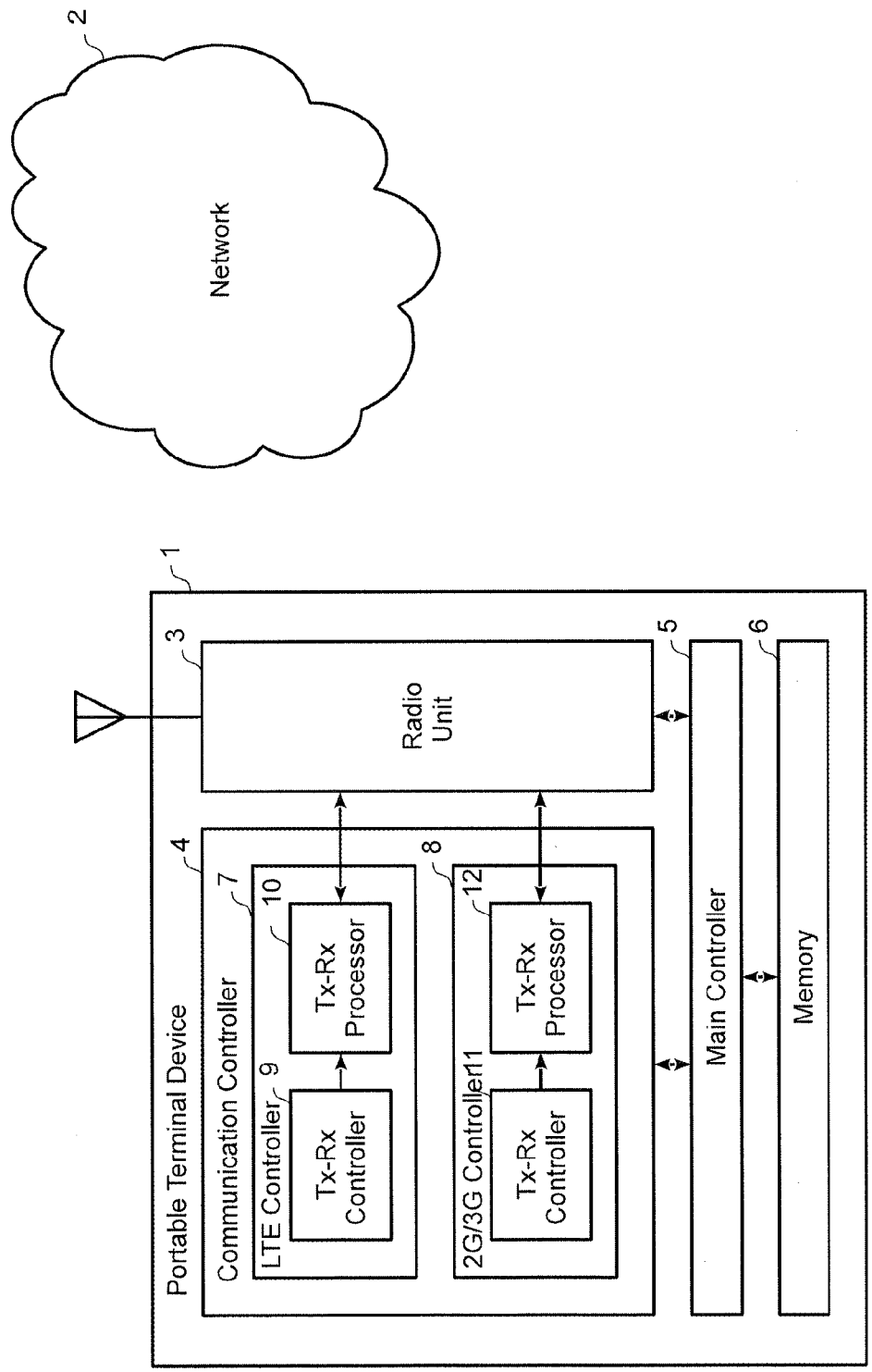
FIG. 1 is a drawing that shows a configuration example of a portable terminal device to be used in a radio access system, together with an example of the use of the radio access system according to an exemplary embodiment of the present invention.

FIG. 1 is a drawing that shows a configuration example of a portable terminal device to be used in a radio access system, together with an example of the use of the radio access system according to an exemplary embodiment of the present invention. The drawing explains the contents as described below.

A portable terminal device 1 and a network 2 can communicate with each other by means of a communication system in relation to a plurality of RATs. In an example explained here, used as two RATs are E-UTRAN (LTE) and GERAN/UTRAN (GSM EDGE Radio Access Network/Universal Terrestrial Radio Access Network).

ISR is activated between the portable terminal device 1 and the network 2, and then the portable terminal device 1 carries out location registration processing every time when a certain time period has passed in relation to the plurality of RATs. As a result, the portable terminal device 1 becomes movable between the RATs, for which location registration processing has already been carried out, without newly carrying out location registration processing. Incidentally, a system is configured in such a way that; under conditions where the portable terminal device 1 and the network 2 hold the potential to have individually different status on whether ISR is active or inactive, even if the network 2 gives the portable terminal device 1 a command to activate ISR, the portable terminal device 1 ignores the command.

The portable terminal device 1 includes: a radio unit 3 that can communicate via radio waves with the network 2 by means of a communication system in relation to a plurality of RATs; and a communication controller 4 for controlling communication by the radio unit 3 with respect to each of the plurality of RATs. The portable terminal device 1 further includes: a main controller 5 for controlling operations of the radio unit 3 and the communication controller 4; and a memory 6 for saving information instructed from the main controller 5, and dealing with reading and writing operations.

The communication controller 4 includes: an LTE controller 7 for controlling a connection with E-UTRAN; and a 2G/3G controller 8 for controlling a connection with GERAN/UTRAN; wherein E-UTRAN and GERAN/UTRAN being inside the network 2 as a counterpart.

The LTE controller 7 includes an LTE transmit-receive controller 9 and an LTE transmit-receive processing section 10. Being configured with communication control software, the LTE transmit-receive controller 9 controls messages and data to be transmitted to, and received from the network 2 as a counterpart. The LTE transmit-receive processing section 10 converts the messages and data to be transmitted to, and received from the network 2 as a counterpart, between one format with which the LTE transmit-receive controller 9 deals and the other format with which the radio unit 3 deals.

The 2G/3G controller 8 includes a 2G/3G transmit-receive controller 11 and a 2G/3G transmit-receive processing section 12. Being configured with communication control software, the 2G/3G transmit-receive controller 11 controls messages and data to be transmitted to, and received from the network 2 as a counterpart. The 2G/3G transmit-receive processing section 12 converts the messages and data to be transmitted to, and received from the network 2 as a counterpart, between one format with which the 2G/3G transmit-receive processing section 12 deals and the other format with which the radio unit 3 deals.

In order to control the communication by the radio unit 3, the communication controller 4 manages the following information:
- Status of ISR (active/inactive) (to be managed with Temporary Identity used in Next update (TIN) as an internal parameter of the portable terminal device, in 3GP);
- Location registration information for the LTE network (TAU Periodic Timer, E-UTRAN deactivate ISR timer, Globally Unique Temporary Identifier (GUTI), and so on); and
- Location registration information for the GERAN/UTRAN network (RAU Periodic Timer, GERAN/UTRAN Deactivate ISR timer, Packet Temporary Mobile Subscriber Identity (P-TMSI), and so on).

Figure 2:
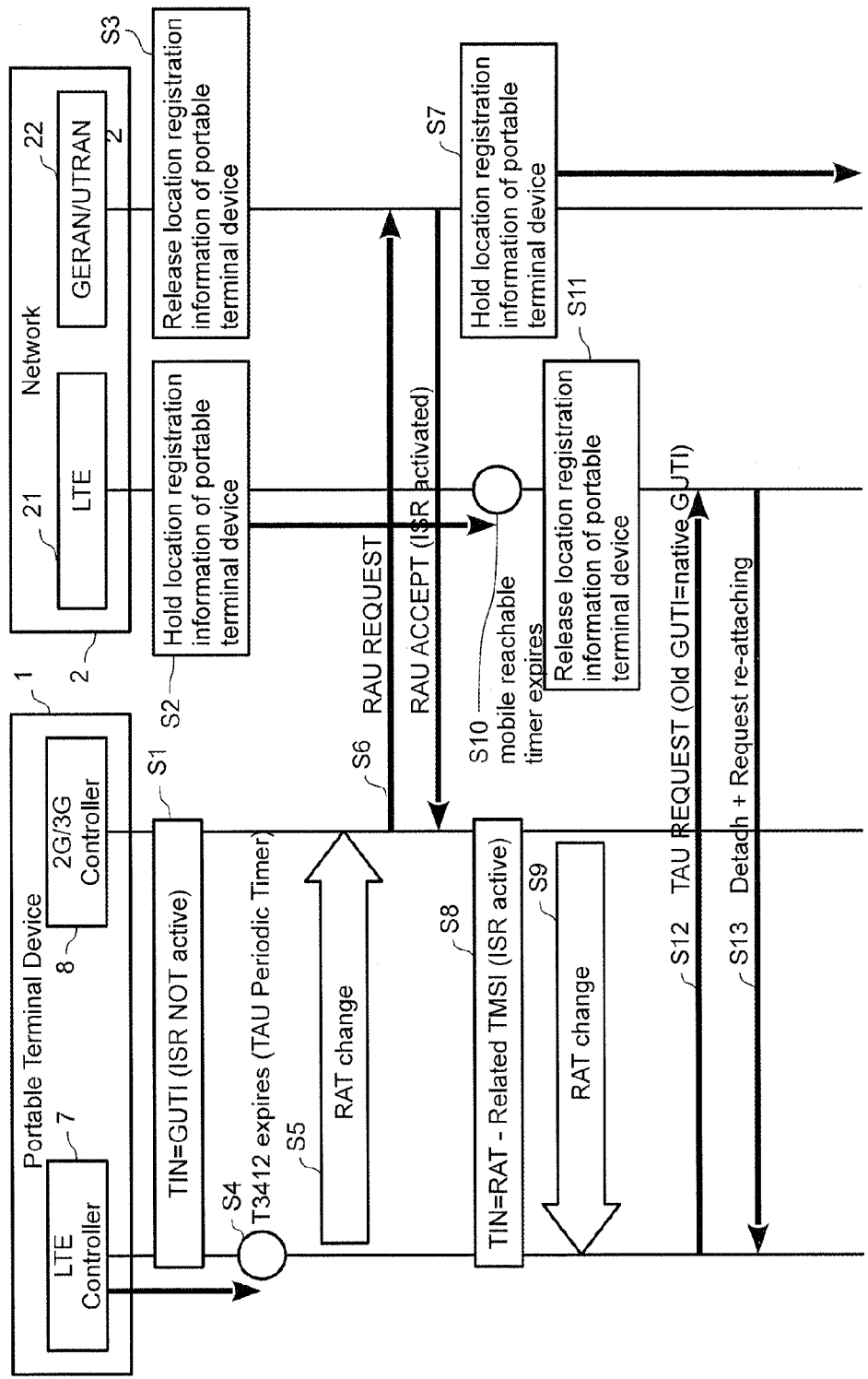
FIG. 2 is a diagram for explaining requirements of 3GPP specifications, and it is also a sequence diagram that shows an example of operations of the portable terminal device and the network.

FIG. 2 is a diagram for explaining requirements of 3GPP specifications, and it is also a sequence diagram that shows an example of operations of the portable terminal device 1 and the network 2.

In this case, it is assumed that ISR is inactive in initial condition of the portable terminal device 1 (Step S1). It is assumed that an LTE network 21 in the network 2 holds location registration information of the portable terminal device 1 at the time (Step S2). This assumption means that, by that time, the portable terminal device 1 has successfully carried out location registration processing for the LTE network 21. In the meantime, it is assumed that a GERAN/UTRAN network 22 in the network 2 does not hold location registration information of the portable terminal device 1 at the time (Step S3). This assumption means that, at the time, location registration processing by the portable terminal device 1 is not yet carried out for the GERAN/UTRAN network 22.

It is specified in 3GPP that, after a certain time period passes with the location registration being once carried out, the portable terminal device 1 tries to carry out again location registration processing for the network 2. The passage of the certain time period is detected by means of expiration of a location registration cycle timer (Tracking Area Update (TAU) Periodic Timer, Routing Area Update (RAU) Periodic Timer, and so on) in the communication controller 4. In the example shown in FIG. 2, the expiration of TAU Periodic Timer is detected. When the location registration cycle timer (TAU Periodic Timer) expires (Step S4), it is requested to start location registration processing, such as TAU. Unfortunately, under conditions that location registration processing cannot get started, for example, in the case of being positioned outside an LTE area, the location registration processing does not get started. In this case, it is specified in 3GPP that, the location registration processing does not get started, until a situation allows it to start next time.

Under the condition, the portable terminal device 1 moves into an area of the GERAN/UTRAN network 22 so as to be located inside a GERAN/UTRAN area (Step S5). The portable terminal device 1 sends a location registration requesting message, such as RAU REQUEST, for starting location registration processing, such as Routing Area Update (RAU), to the GERAN/UTRAN network 22 (Step S6). In response, the GERAN/UTRAN network 22 sends a message (such as RAU ACCEPT) expressing that the request from the portable terminal device 1 has been accepted. By making use of a parameter in the message, the network 2 gives the portable terminal device 1 a command to activate ISR (Step S8).

In the example shown in FIG. 2, although the location registration cycle timer on a side of the portable terminal device 1 expires at Step S4, location registration for the LTE network 21 is not yet carried out in the situation. Under the situation, as far as a location registration cycle timer (such as Mobile reachable timer) that a side of the LTE network 21 owns has not yet expired, the LTE network 21 assumes that location registration is still active. Accordingly, there is a chance that the GERAN/UTRAN network 22 assumes the location registration being in successful condition (Step S7), and both the LTE network 21 and the GERAN/UTRAN network 22 are under a situation where the location registration is successful so that the network 2 recognizes ISR to be active. Nevertheless, as a matter of fact, after the location registration processing of Step S6, the location registration cycle timer of the LTE network 21 expires (Step S10), the location registration information that the LTE network 21 owns about the portable terminal device 1 is released (Step S11). At the time, although the side of the network 2 recognizes ISR to have been inactivated, the side of the portable terminal device 1 recognizes ISR to be active in accordance with the command from the GERAN/UTRAN network 22 (Step S8) in the location registration processing at Step S6. As a result, there arises a situation of conflict with respect to ISR between the portable terminal device 1 and the network 2.

Furthermore, under conditions where arises a situation of conflict with respect to ISR between the portable terminal device 1 and the network 2, even if the portable terminal device 1 moves into a previous RAT (the LTE network 21 in the case of FIG. 2) and attempts to carry out location registration processing on the basis of ISR being active (Step S12), the network 2 cuts off the processing (Step S13). That is because a terminal-specific identifier specified for a location registration requesting message, to be sent by the portable terminal device 1 to the network 2, has a conflict on whether ISR is active or inactive, and then the location registration information from the RAT before moving between the areas cannot be taken over inside the network 2 in accordance with specifications in 3 GPP.

Figure 3:
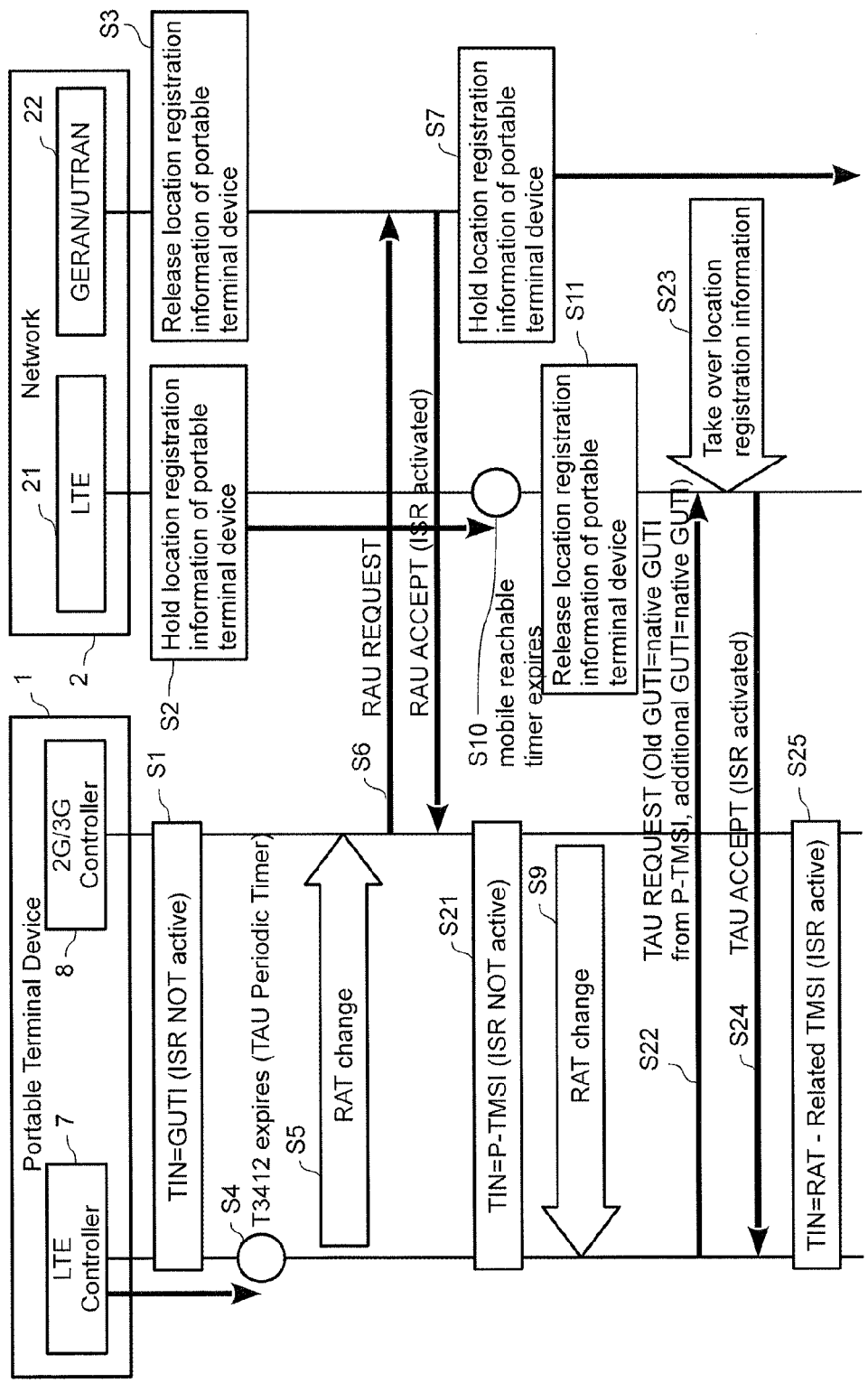
FIG. 3 is a sequence diagram that shows an example of operations of the portable terminal device and the network shown in FIG. 1.

FIG. 3 is a sequence diagram that shows an example of operations of the portable terminal device 1 and the network 2 shown in FIG. 1. In this example of operations; without carrying out location registration processing for a RAT having had location registration up to the time (E-UTRAN (LTE) in this case) even after a passage of a certain time period, if the portable terminal device 1 carries out location registration processing for another RAT (GERAN/UTRAN) under a situation where ISR is inactive, the portable terminal device 1 keeps ISR being inactive, even though the network 2 gives the portable terminal device 1 a command to activate ISR.

In other words, after operation proceeds up to Step S6 in the same manner as shown in FIG. 2, even in the case where the network 2 gives a command to activate ISR in location registration processing at Step S6, the portable terminal device 1 does not activate ISR and just leaves ISR inactive (Step S21).

Thus, when the portable terminal device 1 moves afterwards into an area of the LTE network 21 (Step S9), and sends a location registration requesting message, such as TAU REQUEST, in order to carry out location registration processing for the LTE network 21, a terminal-specific identifier to be specified at the time is for ISR being inactive (Step S22). At the time, the portable terminal device 1 notifies the LTE network 21 that it is needed to take over the location registration information that the GERAN/UTRAN network 22 owns. Therefore, the LTE network 21 can take over the location registration information held at Step S7, from the GERAN/UTRAN network 22 (Step S23). If once the location registration information is successfully taken over, ISR becomes active at the side of the network 2 so that a message transmitted from the LTE network 21 to the portable terminal device 1 also notifies of ISR being active (Step S24). Receiving the message, the portable terminal device 1 activates ISR (Step S25).

In the above description, explained for example is a case where a location registration cycle timer for the LTE network 21 expires, and the location registration information is taken over from the GERAN/UTRAN network 22 to the LTE network 21. In an opposite manner, it is also possible that a location registration cycle timer for the GERAN/UTRAN network 22 expires, and the location registration information is taken over from the LTE network 21 to the GERAN/UTRAN network 22.

Furthermore, even without setting ISR inactive actually in the portable terminal device 1 at Step S21, by way of specifying the terminal-specific identifier with ISR being inactive for the network 2 at Step S22, it also becomes possible to have the portable terminal device 1 practically ignore activation of ISR from the network 2.

Figure 4:
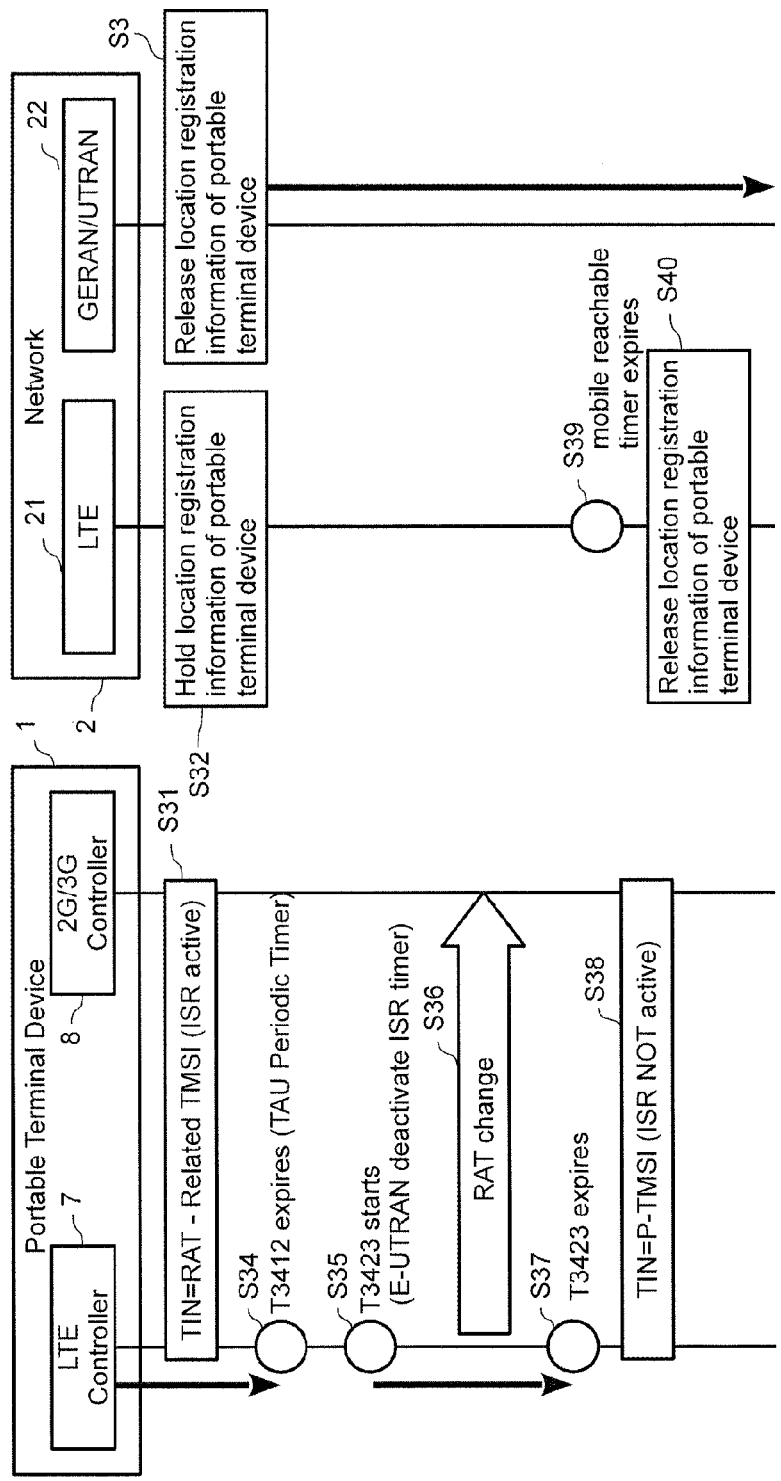
FIG. 4 is a sequence diagram that shows an example of operations of the portable terminal device and the network, with respect to an operation of an ISR inactivation timer to be used by ISR.

FIG. 4 is a sequence diagram that shows an example of operations of the portable terminal device 1 and the network 2, with respect to an operation of an ISR inactivation timer to be used by ISR.

It is assumed that; under a situation where ISR is active, ISR is active in the portable terminal device 1 (Step S31), the LTE network 21 owns location registration information of the portable terminal device 1 (Step S32), and the GERAN/UTRAN network 22 also owns the location registration information of the portable terminal device 1 (Step S33). Under the situation described above; in the case where no location registration processing can start because of, e.g., being positioned outside an LTE area, even though a location registration cycle timer of the portable terminal device 1 expires after a certain time period has passed (Step S34) so that the location registration processing cannot get started, there starts an ISR inactivation timer (E-UTRAN deactivate ISR timer (T3423), and GERAN/UTRAN Deactivate ISR timer (T3323) are defined in 3GPP) (Step S35). When the ISR inactivation timer expires after a certain time period has passed (Step S37), the portable terminal device 1 puts ISR into status of inactivation (Step S38). Furthermore, when a location registration cycle timer expires also at the LTE network 21 (Step S39), the location registration information of the portable terminal device 1 is released (Step S40). Even when ISR at the side of the network 2 gets into status of inactivation in this way, it is defined in accordance with specifications in 3GPP that ISR is consistently in status of inactivation in both the portable terminal device 1 and the network 2.

Nevertheless, if the portable terminal device 1 cannot execute a process of inactivating ISR, the portable terminal device 1 has ISR still in status of activation, and meanwhile the network 2 has ISR in status of inactivation. As a result, there arises a situation of conflict with respect to ISR.

Therefore, it is ensured that; even if a command for activating ISR is given to the network 2, the portable terminal device 1 ignores the command under conditions where the ISR inactivation timer cannot get started. In this context, the "conditions where the ISR inactivation timer cannot get started" include, for example, a situation in which the location registration cycle timer (such as T3412) has already expired even though the network gives a command to activate ISR.

According to the embodiment of the present invention as explained above; even if the location registration cycle timer expires under conditions where ISR is not active, and afterwards the network 2 gives a command to activate ISR with respect to the location registration carried out in a different RAT, operation progresses in such a way that the portable terminal device 1 ignores the command so as not to activate ISR. Accordingly, even in the case where, with ISR not being in status of activation, the network 2 gives a command to activate ISR after the location registration cycle timer owned by the portable terminal device 1 expires, it becomes possible to prevent beforehand a situation of conflict with respect to status of ISR from arising between the portable terminal device 1 and the network 2. As a result, it becomes possible, for example, to prevent unnecessary location registration from occurring, to reduce traffic with the network 2, and to reduce battery power consumption of the portable terminal device 1.

Moreover, as described above, in the case where the portable terminal device 1 moves between areas in such a way as to cross over RATs, the terminal-specific identifier to be specified for the location registration requesting message, which the portable terminal device 1 sends to the network 2, is set with an appropriate value, depending on whether ISR is active or inactive. Therefore, crossing over areas of different RATs, the network 2 can take over location registration information of the portable terminal device 1, by way of preventing beforehand a situation of conflict with respect to status of ISR from arising between the portable terminal device 1 and the network 2, even when the portable terminal device 1 moves into an area of a different RAT, and carries out location registration there. Accordingly, there remains no chance to receive an unnecessary request on releasing registration from the network 2. As a result, it becomes possible to protect a call connection supplied to a user from being interrupted by such an unnecessary request on releasing registration from the network 2.

The invention claimed is:

1. A User Equipment (UE) comprising:
   a receiver configured to receive a Routing Area Update (RAU) Accept message; and
   a setting unit configured to set a Temporary Identity used in Next update (TIN) to Packet Temporary Mobile Subscriber Identity (P-TMSI) in a case in which (1) the TIN is currently set to Globally Unique Temporary Identifier (GUTI), (2) the RAU Accept message contains an indication of Idle mode Signaling Reduction (ISR) being activated, and (3) a periodic tracking area update timer has already expired.

2. The UE according to claim 1, wherein the RAU Accept message is to be received if a RAU Request message, transmitted by the UE, has been accepted.

3. The UE according to claim 1, wherein the setting of the TIN to P-TMSI corresponds to the ISR being deactivated.

4. The UE according to claim 1, wherein the setting of the TIN to GUTI corresponds to the ISR being deactivated.

5. The UE according to claim 1, further comprising:
a transmitter configured to transmit a Tracking Area Update (TAU) request including "GUTI from P-TMSI" as an old GUTI, in a case in which the TIN is set to P-TMSI.

6. The UE according to claim 1, wherein the setting unit is further configured not to set the TIN to a radio access technology (RAT)-related TMSI.

7. A User Equipment (UE) comprising:
a receiver configured to receive a Tracking Area Update (TAU) Accept message; and
a setting unit configured to set a Temporary Identity used in Next update (TIN) to Globally Unique Temporary Identifier (GUTI) in a case in which (1) the TIN is currently set to Packet Temporary Mobile Subscriber Identity (P-TMSI), (2) the TAU Accept message contains an indication of Idle mode Signaling Reduction (ISR) being activated, and (3) a periodic routing area update timer has already expired.

8. The UE according to claim 7, wherein the TAU Accept message is to be received if a TAU Request message, transmitted by the UE, has been accepted.

9. The UE according to claim 7, wherein the setting of the TIN to GUTI corresponds to the ISR being deactivated.

10. The UE according to claim 7, wherein the setting of the TIN to P-TMSI corresponds to the ISR being deactivated.

11. The UE according to claim 7, further comprising:
a transmitter configured to transmit a TAU request including "P-TMSI from GUTI" as an old P-TMSI, in a case in which the TIN is set to GUTI.

12. The UE according to claim 7, wherein the setting unit is further configured not to set the TIN to a radio access technology (RAT)-related TMSI.

13. A paging processing method, comprising:
receiving, by a User Equipment (UE), a Routing Area Update (RAU) Accept message; and
setting of a Temporary Identity used in Next update (TIN) to Packet Temporary Mobile Subscriber Identity (P-TMSI) in a case in which (1) the TIN is currently set to Globally Unique Temporary Identifier (GUTI), (2) the RAU Accept message contains an indication of Idle mode Signaling Reduction (ISR) being activated, and (3) a periodic tracking area update timer has already expired.

14. The paging processing method according to claim 13, wherein the RAU Accept message is to be received if a RAU Request message, transmitted by the UE, has been accepted.

15. The method according to claim 13, wherein the setting of the TIN to P-TMSI corresponds to the ISR being deactivated.

16. The method according to claim 13, wherein the setting of the TIN to GUTI corresponds to the ISR being deactivated.

17. The method according to claim 13, further comprising:
transmitting a Tracking Area Update (TAU) request including "GUTI from P-TMSI" as an old GUTI, in a case in which the TIN is set to P-TMSI.

18. The method according to claim 13, wherein the setting of the TIN to P-TMSI further comprises not setting the TIN to a radio access technology (RAT)-related TMSI.

19. A paging processing method, comprising:
receiving, by a User Equipment (UE), a Tracking Area Update (TAU) Accept message; and
setting of a Temporary Identity used in Next update (TIN) to Globally Unique Temporary Identifier (GUTI) in a case in which (1) the TIN is currently set to Packet Temporary Mobile Subscriber Identity (P-TMSI), (2) the TAU Accept message contains an indication of Idle mode Signaling Reduction (ISR) being activated, and (3) a periodic routing area update timer has already expired.

20. The paging processing method according to claim 19, wherein the TAU Accept message is to be received if a TAU Request message, transmitted by the UE, has been accepted.

21. The method according to claim 19, wherein the setting of the TIN to GUTI corresponds to the ISR being deactivated.

22. The method according to claim 19, wherein the setting of the TIN to P-TMSI corresponds to the ISR being deactivated.

23. The method according to claim 19, further comprising:
transmitting a TAU request including "P-TMSI from GUTI" as an old P-TMSI, in a case in which the TIN is set to GUTI.

24. The method according to claim 19, wherein the setting of the TIN to GUTI further comprises not setting the TIN to a radio access technology (RAT)-related TMSI.

* * * * *